United States Patent
Omori et al.

(10) Patent No.: US 12,041,232 B2
(45) Date of Patent: Jul. 16, 2024

(54) ENCODING METHOD, ENCODING APPARATUS AND PROGRAM

(71) Applicant: NIPPON TELEGRAPH AND TELEPHONE CORPORATION, Tokyo (JP)

(72) Inventors: Yuya Omori, Musashino (JP); Ken Nakamura, Musashino (JP); Daisuke Kobayashi, Musashino (JP); Hiroe Iwasaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 121 days.

(21) Appl. No.: 17/783,056

(22) PCT Filed: Dec. 9, 2019

(86) PCT No.: PCT/JP2019/048104
§ 371 (c)(1),
(2) Date: Jun. 7, 2022

(87) PCT Pub. No.: WO2021/117091
PCT Pub. Date: Jun. 17, 2021

(65) Prior Publication Data
US 2023/0022215 A1    Jan. 26, 2023

(51) Int. Cl.
*H04N 19/119* (2014.01)
*H04N 19/14* (2014.01)
(Continued)

(52) U.S. Cl.
CPC ........... *H04N 19/119* (2014.11); *H04N 19/14* (2014.11); *H04N 19/176* (2014.11); *H04N 19/182* (2014.11)

(58) Field of Classification Search
CPC .... H04N 19/119; H04N 19/14; H04N 19/176; H04N 19/182
(Continued)

(56) References Cited

U.S. PATENT DOCUMENTS

| | | | | |
|---|---|---|---|---|
| 9,014,265 B1* | 4/2015 | Rintaluoma | ......... | H04N 19/176 375/240.18 |
| 2015/0195520 A1* | 7/2015 | Li | ........................ | H04N 19/136 375/240.02 |

(Continued)

FOREIGN PATENT DOCUMENTS

JP        201182801 A      4/2011

OTHER PUBLICATIONS

Santiago De-Luxàn-Hernàndez et al., CE3:Intra Sub-Partitions Coding Mode (Tests 1.1.1 and 1.1.2), JVET-M0102-v2, Joint Video Experts Team of ITU-T, 13th Meeting, Jan. 9, 2019.

*Primary Examiner* — Dominic D Saltarelli
(74) *Attorney, Agent, or Firm* — Harness, Dickey & Pierce, P.L.C.

(57) ABSTRACT

A coding method encodes an image by dividing the image into blocks, and comprises: dividing a coding target image into a plurality of coding unit blocks; determining whether or not to encode by dividing the coding unit block into a plurality of sub-coding unit blocks, on a basis of an edge direction and an edge strength of an edge obtained for each pixel in the coding unit block; and encoding, in a case of determining to divide the coding unit block into a plurality of sub-coding unit blocks in the determining step, a first sub-coding unit block by referencing a second sub-coding unit block inside the same coding unit block as the first sub-coding unit block.

9 Claims, 5 Drawing Sheets

(51) Int. Cl.
*H04N 19/176* (2014.01)
*H04N 19/182* (2014.01)

(58) Field of Classification Search
USPC .................................................. 375/240.24
See application file for complete search history.

(56) References Cited

U.S. PATENT DOCUMENTS

| 2015/0208090 | A1* | 7/2015 | Sakakibara | ............ | H04N 19/14 |
| | | | | | 375/240.12 |
| 2018/0048915 | A1* | 2/2018 | Jeon | ........................ | H04N 19/61 |
| 2021/0120239 | A1* | 4/2021 | Zhu | ...................... | H04N 19/176 |

* cited by examiner

ENCODING METHOD, ENCODING APPARATUS AND PROGRAM

CROSS-REFERENCE TO RELATED APPLICATIONS

This application is a 371 U.S. National Phase of International Application No. PCT/JP2019/048104, filed on Dec. 9, 2019. The entire disclosure of the above application is incorporated herein by reference.

TECHNICAL FIELD

The present invention relates to a coding method, a coding device, and a program.

BACKGROUND ART

Schemes such as MPEG (Moving Picture Experts Group)-2, MPEG-4, and H.264/MPEG-4 AVC (Advanced Video Coding) are widely used as video coding technologies. In particular, the most recent international video coding standard H.265/HEVC (High Efficiency Video Coding) (hereinafter referred to as "HEVC") has proliferated in recent years. Furthermore, work on H.266/VVC (Versatile Video Coding) (hereinafter, referred to as "VVC") is underway as an international video coding standard to be a successor to H.265/HEVC, with the goal of achieving standardization in July 2020. Work on VVC is underway with the goal of achieving double the coding efficiency of HEVC.

In video coding according to standards such as HEVC and VVC, an improvement in coding efficiency is achieved by performing intra prediction coding. Intra prediction coding refers to a coding scheme that, when encoding a coding unit (CU) which is a block treated as the units of coding, the pixel values of pixels in the CU to be encoded (hereinafter referred to as the "coding target CU") are predicted/estimated and compensated on the basis of the pixel values of pixels positioned near the CU to be encoded. Specifically, intra prediction coding generates a predicted image of the coding target CU by referencing a plurality of pixels in already-generated reconstructed image (that is, image that have been encoded and decoded) positioned in CUs adjacent to the coding target CU. Intra prediction coding encodes the difference between the input image and the predicted image. When generating the predicted image, intra prediction coding determines an intra prediction mode for which a rate-distortion (RD) cost is minimized for each CU. Existing intra prediction modes include a plurality of directional prediction modes (angular modes), a direct current prediction mode (DC mode), and a planar prediction mode (planar mode). The number of angular modes is set to 33 modes in HEVC and 65 modes in VVC.

As described above, in intra prediction coding, the encoder ideally selects the intra prediction mode for which the RD cost is minimized. However, calculating the RD cost requires the processes of predicted image generation, differential image generation, frequency transform such as the discrete cosine transform (DCT), quantization, and entropy coding in the form of context-based adaptive binary arithmetic coding (CABAC). In particular, frequency transform and entropy coding are computationally intensive, and in some cases the encoder may have difficulty in calculating the respective RD costs for all intra prediction modes for each CU.

Given the above, in many cases the intra prediction mode is determined by using the value of a cost obtained by simplifying the RD cost (hereinafter referred to as the "simplified cost"). For example, instead of the RD cost, the value obtained by adding overhead bits to the sum of absolute transformed differences (SATD) of the differential image may be used as the simplified cost. The encoder performs the processes of predicted image generation, differential image generation, frequency transform, quantization, inverse quantization, and inverse frequency transform only for a single intra prediction mode determined on the basis of the simplified cost, and generates a reconstructed image of the coding target CU. The generated reconstructed image is referenced in the intra prediction coding of other coding target CUs encoded thereafter. According to this method of using a simplified cost, the encoder only has to perform the above processes of frequency transform, etc. once in the generation of the reconstructed image. In other words, the encoder does not need to perform the above processes of frequency transform, etc. to determine the intra prediction mode.

In intra prediction coding according to VVC, an additional technique referred to as the intra sub-partition (ISP) prediction process has been proposed. In the ISP prediction process, the CU is divided vertically or horizontally. Also, in the ISP prediction process, the CU is divided into two or four sub-CUs. Also, in the ISP prediction process, the same intra prediction mode is used for all sub-CUs divided from the same CU. Consequently, it is possible to express the intra prediction mode of the two or four sub-CUs with just a single flag, and the code size is reduced.

Also, as described above, ordinary intra prediction coding performs intra prediction for the coding target CU by referencing the reconstructed images of adjacent CUs. In contrast, the ISP prediction process successively generates a reconstructed image for each sub-CU, and therefore can perform intra prediction for a sub-CU of the coding target by referencing the reconstructed images of adjacent sub-CUs. For this reason, the ISP prediction process is capable of referencing more highly correlated pixels with a short spatial distance between the coding target pixel and the reference pixel compared to ordinary intra prediction coding. With this arrangement, the ISP prediction process is capable of further improving the prediction accuracy and reducing the code size of the predicted image.

Also, in the ISP prediction process, information indicating whether or not the ISP prediction process should be used and information indicating the direction (vertical direction or horizontal direction) in which the CU should be divided are transmitted as respective flags. Note that in the ISP prediction process, the number of CUs (two or four) into which the CU should be divided is determined automatically on the basis of the size of the coding target CU. Consequently, in the ISP prediction process, a flag indicating how many CUs into which the CU should be divided is unnecessary.

CITATION LIST

Non-Patent Literature

Non-Patent Literature 1: S. De-Luxan-Hernandez, et al., "CE3: Intra Sub-Partitions Coding Mode (Tests 1.1.1 and 1.1.2)," JVET-M0102-v2, Joint Video Experts Team of ITU-T, 13th Meeting Marrakech, January 2019.

SUMMARY OF THE INVENTION

Technical Problem

The ISP prediction process reduces the code size by expressing the intra prediction mode of all sub-CUs with just a single flag. This is because the respective intra prediction modes of sub-CUs divided from the same CU are presumed to resemble each other. However, in the case where there are variations in the intra prediction modes that should have been determined for each sub-CU in the case of not using the ISP prediction process, sub-CUs occur in which intra prediction is performed after determination to use and by using intra prediction modes completely different from the intra prediction modes that should have been determined. Consequently, the prediction accuracy of intra prediction is lowered in some cases, even if there is a short distance between the coding target pixel and the reference pixel. In other words, if the ISP prediction process is used, the code size may actually increase in some cases. In actuality, variations in the intra prediction modes of the sub-CUs are not rare, and the use of the ISP prediction process is undesirable in some cases.

On the other hand, in the ISP prediction process, it is possible to determine whether or not the ISP prediction process should be used by calculating and comparing the respective RD costs for all intra prediction modes for each sub-CU. However, in the case of determining that the ISP prediction process should not be used, the processes performed for the determination are wasted. Moreover, the processes performed for the determination are extremely computationally intensive.

As described above, in ordinary intra prediction, the various processes for reconstructed image generation are executed just once for only a single intra prediction mode determined on the basis of the simplified cost instead of the RD cost, and the amount of processing can be reduced. In contrast, in the ISP prediction process, the intra prediction mode of the sub-CUs in the same CU is shared, and the reference pixels in intra prediction are other sub-CUs in the same CU. Consequently, the intra prediction mode cannot be defined successively for each sub-CU. In the ISP prediction process, in the case of calculating the cost for an intra prediction mode, the reconstructed image according to the intra prediction mode for a first sub-CU cannot be referenced in the intra prediction according to the intra prediction mode for a second sub-CU until after the reconstructed image is generated. In this way, in the ISP prediction process, it is necessary to generate reconstructed images for the cases of all candidate intra prediction modes in each sub-CU. Consequently, in the ISP prediction process, the various processes for reconstructed image generation must be executed a number of times corresponding to the number of candidate intra prediction modes.

In this way, the ISP prediction process is extremely computationally intensive compared to ordinary intra prediction. Also, to determine whether or not the ISP prediction process should be used, it is necessary to calculate the respective RD costs for all intra prediction modes for each sub-CU, and the processes involved in the determination are often extremely computationally intensive. Moreover, in the determination of the intra prediction mode in the ISP prediction process, a flag indicating the CU division direction (vertical direction or horizontal direction) and a flag indicating which intra prediction mode to use from among all of the 67 intra prediction modes in VVC are necessary. Consequently, because the reconstructed image of each sub-CU needs to be generated for all combinations of a division direction and an intra prediction mode, the ISP prediction process has a problem of imposing a large computational load on the encoder.

The present invention has been devised in light of such circumstances, and an objective thereof is to provide a technology capable of reducing the amount of processing of the intra sub-partition (ISP) prediction process in intra prediction coding.

Means for Solving the Problem

One aspect of the present invention is a coding method encodes an image by dividing the image into blocks, comprising: dividing a coding target image into a plurality of coding unit blocks; determining whether or not to encode by dividing the coding unit block into a plurality of sub-coding unit blocks, on a basis of an edge direction and an edge strength of an edge obtained for each pixel in the coding unit block; and encoding, in a case of determining to divide the coding unit block into a plurality of sub-coding unit blocks in the determining step, a first sub-coding unit block by referencing a second sub-coding unit block inside the same coding unit block as the first sub-coding unit block.

Another aspect of the present invention is a coding device that encodes an image by dividing the image into blocks, comprising: a division unit that divides a coding target image into a plurality of coding unit blocks; a determination unit that determines whether or not to encode by dividing the coding unit block into a plurality of sub-coding unit blocks, on a basis of an edge direction and an edge strength of an edge obtained for each pixel in the coding unit block; and an encoding unit that, in a case where the determination unit determines to divide the coding unit block into a plurality of sub-coding unit blocks, encodes a first sub-coding unit block by referencing a second sub-coding unit block inside the same coding unit block as the first sub-coding unit block.

Another aspect of the present invention is a program causing a computer that encodes an image by dividing the image into blocks to execute a process comprising: dividing a coding target image into a plurality of coding unit blocks; determining whether or not to encode by dividing the coding unit block into a plurality of sub-coding unit blocks, on a basis of an edge direction and an edge strength of an edge obtained for each pixel in the coding unit block; and encoding, in a case of determining to divide the coding unit block into a plurality of sub-coding unit blocks in the determining step, a first sub-coding unit block by referencing a second sub-coding unit block inside the same coding unit block as the first sub-coding unit block.

Effects of the Invention

According to the present invention, the amount of processing of the intra sub-partition (ISP) prediction process in intra prediction coding can be reduced.

DESCRIPTION OF EMBODIMENTS

First Embodiment

Hereinafter, a video coding device 100 according to a first embodiment of the present invention will be described with reference to the drawings.

[Configuration of Video Coding Device]

Hereinafter, a functional configuration of the video coding device 100 will be described.

Figure 1:
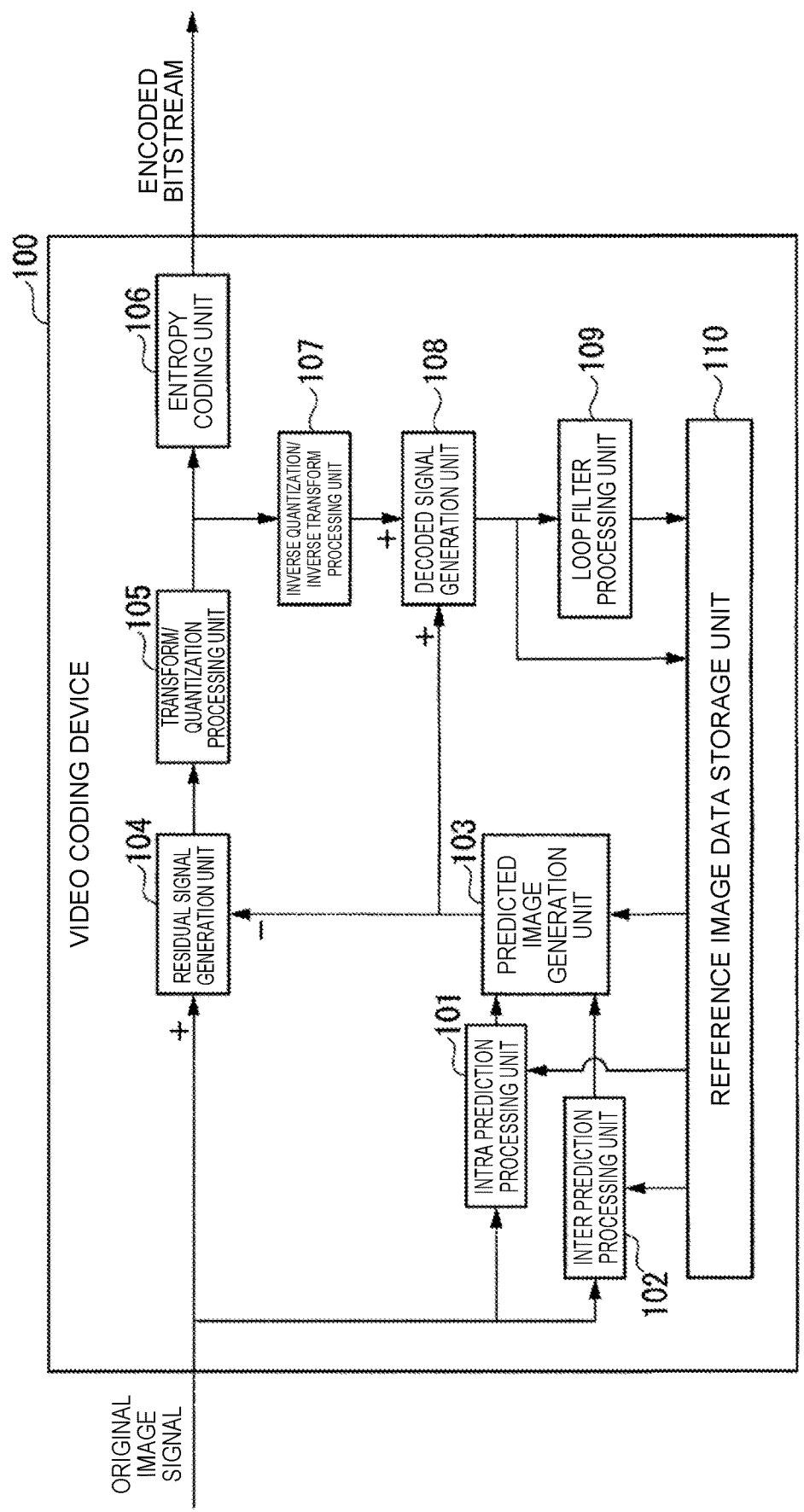
FIG. 1 is a block diagram illustrating a functional configuration of a video coding device 100 according to a first embodiment of the present invention.

FIG. 1 is a block diagram illustrating a functional configuration of the video coding device 100 according to the first embodiment of the present invention. The video coding device 100 receives the input of a video signal (hereinafter referred to as the "original image signal") expressing a coding target CU. The video coding device 100 encodes the inputted original image signal according to designated parameters. Thereafter, the video coding device 100 outputs an encoded bit stream expressing the encoded result.

As illustrated in FIG. 1, the video coding device 100 includes an intra prediction processing unit 101, an inter prediction processing unit 102, a predicted image generation unit 103, a residual signal generation unit 104, a transform/quantization processing unit 105, an entropy coding unit 106, an inverse quantization/inverse transform processing unit 107, a decoded signal generation unit 108, a loop filter processing unit 109, and a reference image data storage unit 110.

The predicted image generation unit 103 acquires information indicating a prediction result outputted from the intra prediction processing unit 101 or the inter prediction processing unit 102. The predicted image generation unit 103 follows the information indicating the prediction result to reference past decoded image data saved in the reference image data storage unit 110 and generates a predicted signal of the original image signal. The predicted image generation unit 103 outputs the predicted signal to the residual signal generation unit 104 and the decoded signal generation unit 108.

The residual signal generation unit 104 acquires the original image signal. Also, the residual signal generation unit 104 acquires the predicted signal outputted from the predicted image generation unit 103. The residual signal generation unit 104 calculates the difference between the original image signal and the predicted signal. The residual signal generation unit 104 outputs a prediction residual signal expressing the calculated difference to the transform/quantization processing unit 105.

The transform/quantization processing unit 105 acquires the prediction residual signal outputted from the residual signal generation unit 104. The transform/quantization processing unit 105 applies an orthogonal transform such as the DCT transform to the acquired prediction residual signal, and generates transform coefficients. The transform/quantization processing unit 105 quantizes the generated transform coefficients. The transform/quantization processing unit 105 outputs the quantized transform coefficients to the entropy coding unit 106 and the inverse quantization/inverse transform processing unit 107.

The entropy coding unit 106 acquires the quantized transform coefficients outputted from the transform/quantization processing unit 105. The entropy coding unit 106 entropy encodes the quantized transform coefficients. The entropy coding unit 106 outputs an encoded bit stream expressing the entropy encoded result.

The inverse quantization/inverse transform processing unit 107 acquires the quantized transform coefficients outputted from the transform/quantization processing unit 105. The inverse quantization/inverse transform processing unit 107 inversely quantizes the quantized transform coefficients. The inverse quantization/inverse transform processing unit 107 applies an inverse orthogonal transform to the inversely quantized transform coefficients, and generates a prediction residual decoded signal. The inverse quantization/inverse transform processing unit 107 outputs the generated prediction residual decoded signal to the decoded signal generation unit 108.

The decoded signal generation unit 108 acquires the predicted signal outputted from the predicted image generation unit 103. Also, the decoded signal generation unit 108 acquires the prediction residual decoded signal outputted from the inverse quantization/inverse transform processing unit 107. The decoded signal generation unit 108 generates a decoded signal of the coding target CU by adding together the predicted signal and the prediction residual decoded signal. The decoded signal generation unit 108 outputs the generated decoded signal to the loop filter processing unit 109 and the reference image data storage unit 110.

The loop filter processing unit 109 acquires the decoded signal outputted from the decoded signal generation unit 108. The loop filter processing unit 109 generates a reference image by filtering the acquired decoded signal. Here, filtering refers to a process of reducing coding distortion. The loop filter processing unit 109 outputs the generated reference image to the reference image data storage unit 110.

The reference image data storage unit 110 acquires the decoded signal outputted from the decoded signal generation unit 108 and the reference image outputted from the loop filter processing unit 109. Hereinafter, the decoded signal outputted from the decoded signal generation unit 108 is also referred to as the "decoded signal before loop filter processing". Also, the reference image outputted from the loop filter processing unit 109 is also referred to as the "decoded signal after loop filter processing". The reference image data storage unit 110 stores the decoded signal before loop filter processing and the decoded signal after loop filter processing. The decoded signal before loop filter processing and the decoded signal after loop filter processing stored in the reference image data storage unit 110 are used in the prediction process by the intra prediction processing unit 101, the prediction process by the inter prediction processing unit 102, and the predicted image generation process by the predicted image generation unit 103.

The intra prediction processing unit 101 acquires the original image signal. Also, the intra prediction processing unit 101 acquires the decoded signal before loop filter processing from the reference image data storage unit 110. The intra prediction processing unit 101 performs intra prediction on the original image signal using the acquired decoded signal before loop filter processing. The intra prediction processing unit 101 outputs information indicating the prediction result from intra prediction to the predicted image generation unit 103. Note that the configuration of the intra prediction processing unit 101 will be described in detail later.

The inter prediction processing unit 102 acquires the original image signal. The inter prediction processing unit 102 acquires the decoded signal after loop filter processing from the reference image data storage unit 110. The inter prediction processing unit 102 performs a process of searching for inter-frame motion on the original image signal by using the acquired decoded signal after loop filter processing. The inter prediction processing unit 102 outputs information indicating the prediction result from inter prediction to the predicted image generation unit 103.

[Configuration of Intra Prediction Processing Unit]

Hereinafter, a functional configuration of the intra prediction processing unit 101 will be described in further detail.

Figure 2:
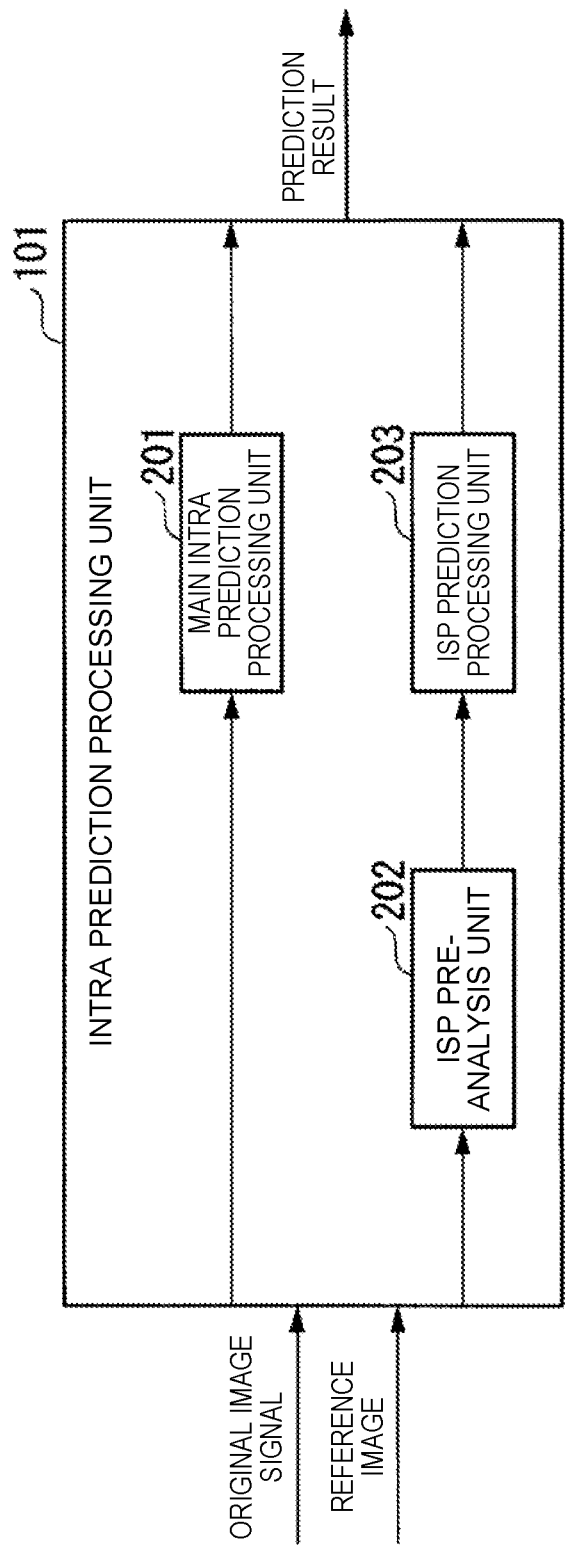
FIG. 2 is a block diagram illustrating a functional configuration of an intra prediction processing unit 101 according to the first embodiment of the present invention.

FIG. 2 is a block diagram illustrating a functional configuration of the intra prediction processing unit 101 according to the first embodiment of the present invention.

As illustrated in FIG. 2, the intra prediction processing unit 101 includes a main intra prediction processing unit 201, an ISP pre-analysis unit 202, and an ISP prediction processing unit 203.

The intra prediction processing unit 101 acquires the original image signal. Also, the intra prediction processing unit 101 acquires the reference image (decoded signal before loop filter processing) from the reference image data storage unit 110.

The main intra prediction processing unit 201 uses the original image signal and the reference signal to perform ordinary intra prediction. In other words, the main intra prediction processing unit 201 references reference pixels near the coding target CU according to an intra prediction mode for the coding target CU. In VVC, there are a maximum of 67 modes (one DC mode, one planar mode, and 65 angular modes) to treat as candidates of intra prediction mode.

The main intra prediction processing unit 201 calculates an index value of an evaluation index (for example, RD cost) for each intra prediction mode with respect to the coding target CU. The main intra prediction processing unit 201 determines the intra prediction mode having the most favorable index value from among the calculated index values as the intra prediction mode of the coding target CU. The main intra prediction processing unit 201 outputs information indicating the determined intra prediction mode to the predicted image generation unit 103 as a prediction result.

The ISP pre-analysis unit 202 performs a pre-analysis for the ISP prediction process to be performed by the ISP prediction processing unit 203. Through the pre-analysis, the ISP pre-analysis unit 202 determines whether or not the ISP prediction process should be executed. Also, in the case of performing the ISP prediction process, the ISP pre-analysis unit 202 determines the division direction(s) (that is, the vertical direction, the horizontal direction, or both) of the candidate CU. Also, in the case of performing the ISP prediction process, the ISP pre-analysis unit 202 determines the candidate intra prediction modes in the ISP prediction process. The ISP pre-analysis unit 202 outputs information indicating the determined results (whether or not the ISP prediction process should be executed, the division direction(s) of the candidate CU, and the candidate intra prediction modes) to the ISP prediction processing unit 203.

The ISP prediction processing unit 203 acquires the information outputted from the ISP pre-analysis unit 202. The ISP prediction processing unit 203 determines operations on the basis of the acquired information. For example, in the case where the acquired information is information indicating that the ISP prediction process should not be performed, the ISP prediction processing unit 203 does not execute the ISP prediction process (that is, does nothing). As another example, in the case where the acquired information is information indicating that the ISP prediction process should be performed, the ISP prediction processing unit 203 performs the ISP prediction process.

In the case of performing the ISP prediction process, the ISP prediction processing unit 203 divides the coding target CU into 2 multiple (two or four) sub-CUs. Note that the ISP prediction processing unit 203 determines how many sub-CUs to divide the coding target CU into on the basis of the size of the coding target CU.

The ISP prediction processing unit 203 divides the coding target CU in the vertical direction or the horizontal direction and performs the ISP prediction process. The ISP prediction processing unit 203 determines whether to divide the coding target CU in the vertical direction and perform the ISP prediction process, divide the coding target CU in the horizontal direction and perform the ISP prediction process, or perform both of these ISP prediction processes on the basis of the information acquired from the ISP pre-analysis unit 202.

In the ISP prediction process, the intra prediction mode is shared among the sub-CUs inside a single CU. In each sub-CU, reference pixels in other sub-CUs near the sub-CU are referenced according to the intra prediction mode. Additionally, a decoded image is generated appropriately for each intra prediction mode, and the pixels in the decoded images of the preceding sub-CUs are used as reference pixels in the ISP prediction process for the subsequent other sub-CUs.

Like the intra prediction modes used by the main intra prediction processing unit 201 above, in the ISP prediction process of VVC there are a maximum of 67 modes (one DC mode, one planar mode, and 65 angular modes). However, the number of intra prediction modes actually used may be reduced greatly from 67 modes according to the candidate intra prediction modes determined by the ISP pre-analysis unit 202 described above.

In the case of performing the ISP prediction process, the ISP prediction processing unit 203 calculates an index value of an evaluation index (for example, RD cost) for each candidate division direction with respect to the coding target CU. Also, in the case of performing the ISP prediction process, the ISP prediction processing unit 203 calculates an index value of the evaluation index for each candidate intra prediction mode with respect to the coding target CU.

The ISP prediction processing unit 203 determines the division direction having the most favorable index value from among the index values calculated for each of the candidate division directions as the division direction of the coding target CU. Also, the ISP prediction processing unit 203 determines the intra prediction mode having the most favorable index value from among the index values calculated for each of the candidate intra prediction modes as the intra prediction mode of the coding target CU. The intra prediction mode outputs information indicating the determined division direction and intra prediction mode to the predicted image generation unit 103 as a prediction result.

Note that the main intra prediction processing unit 201 may also be configured to perform the intra prediction process only in the case where the ISP prediction process is not performed by the ISP prediction processing unit 203, on the basis of the determination by the ISP pre-analysis unit 202. Alternatively, the main intra prediction processing unit 201 may be configured to always perform the intra prediction process, irrespectively of whether or not the ISP prediction process is performed by the ISP prediction processing unit 203. Note that in the case where the main intra prediction processing unit 201 is configured to always perform the intra prediction process, the intra prediction processing unit 101 may also compare the following two index values and output the more favorable index value to the predicted image generation unit 103 as a prediction result, for example. The first is the index value for the intra prediction mode provisionally determined by the main intra prediction processing unit 201. The second is the index value for the division direction and intra prediction mode in the ISP prediction process provisionally determined by the ISP prediction processing unit 203.

By providing the configuration described above, in the video coding device 100 according to the present embodiment, the similarity of edge information between respective sub-CUs is calculated by the ISP pre-analysis unit 202. The video coding device 100 uses the similarity to determine whether or not the ISP prediction process should be executed and also each parameter of the ISP prediction process. With this arrangement, the video coding device 100 can reduce the amount of processing in the ISP prediction process during video encoding.

[Operations by ISP Pre-Analysis Unit]

Hereinafter, an example of the operations in the ISP pre-analysis process performed by the ISP pre-analysis unit 202 will be described.

Figure 3:
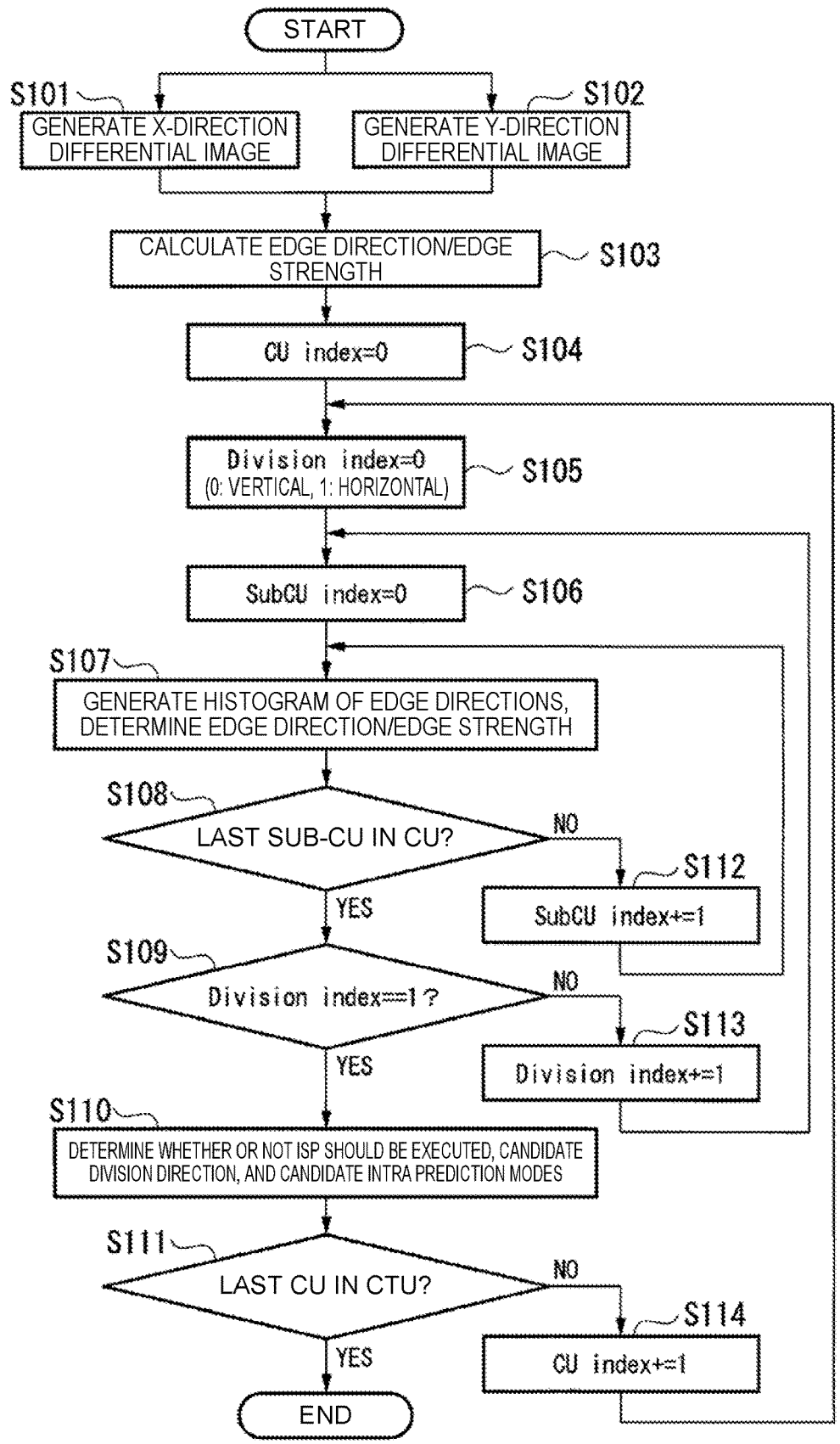
FIG. 3 is a flowchart illustrating operations by an ISP pre-analysis unit 202 according to the first embodiment of the present invention.

FIG. 3 is a flowchart illustrating operations by the ISP pre-analysis unit 202 according to the first embodiment of the present invention. The operations illustrated in this flowchart are initiated when the ISP pre-analysis unit 202 starts the ISP pre-analysis process with respect to a coding tree unit (CTU) of the coding target.

The ISP pre-analysis unit 202 respectively generates a differential image in the X direction and a differential image in the Y direction with respect to the CTU of the coding target (step S101 and step S102). Note that a filter such as a first-order differential filter, a Prewitt filter, or a Sobel filter may be used to generate the differential images. With this arrangement, an X-direction differential strength and a Y-direction differential strength are respectively obtained for all pixels existing in the CTU of the coding target.

The ISP pre-analysis unit 202 calculates an edge direction and an edge strength for each pixel in the CTU of the coding target (step S104). For example, the ISP pre-analysis unit 202 may treat the L1 norm or the L2 norm (rounded to an integer value) between the X-direction differential strength and the Y-direction differential strength as the edge strength for each pixel in the CTU of the coding target.

Figure 4:
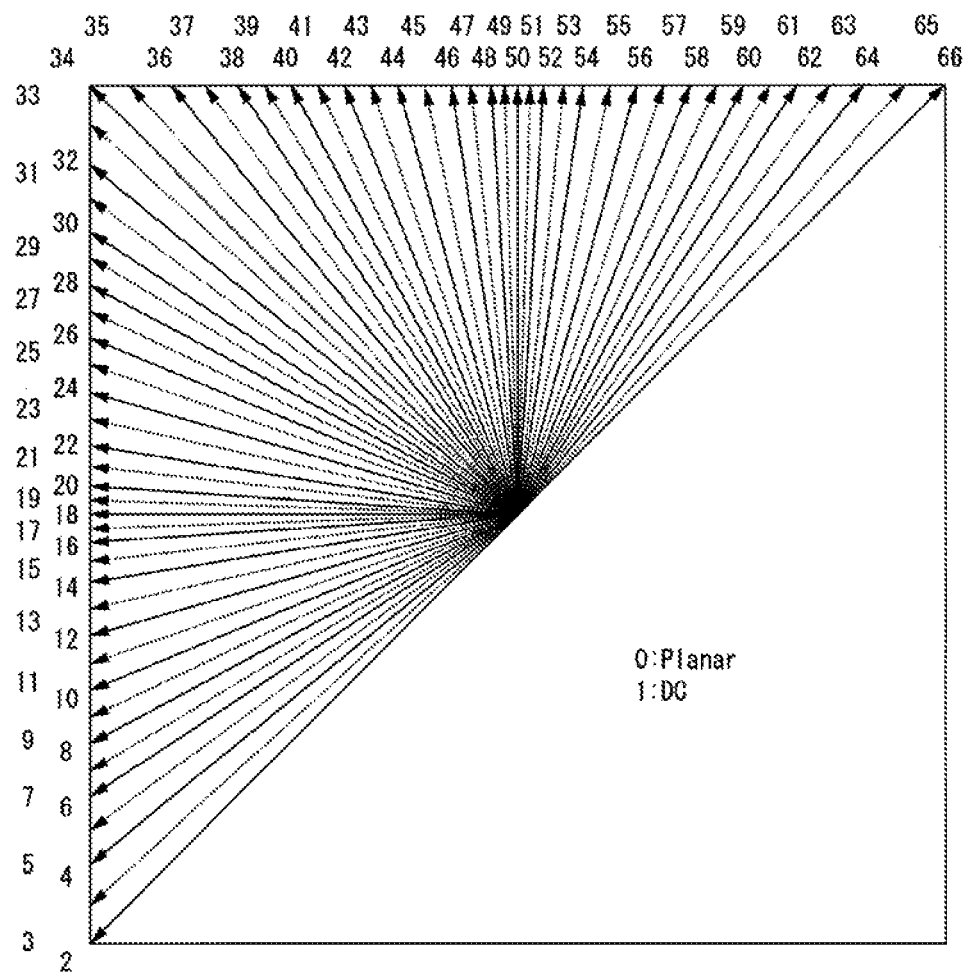
FIG. 4 is a diagram illustrating intra prediction modes in VVC.

FIG. 4 is a diagram illustrating the VVC intra prediction modes. In the case of VVC angular prediction, the intra prediction directions are classified into a total of 65 directions from mode 2 to mode 66, as in FIG. 4. Because the differential direction of each pixel is understood from the X-direction differential strength and the Y-direction differential strength, the ISP pre-analysis unit 202 may determine the direction closest to the differential direction of each pixel (or the direction inverted 180 degrees from the differential direction) from among the 65 intra prediction directions in VVC angular prediction as the edge direction of the target pixel. Here, the edge direction of each pixel is an integer from 2 to 66.

Note that the 65 intra prediction directions cover a range of 180 degrees in the upper-left direction. Consequently, in the case where the calculated differential direction indicates the 180-degree portion in the lower-right direction, the ISP pre-analysis unit 202 may invert the differential direction 180 degrees and then determine the closest direction as the edge direction of the target pixel.

After performing the process from step S101 to step S103 above on the entire CTU, the ISP pre-analysis unit 202 performs the process from step S105 to step S111 below on each CU. The ISP pre-analysis unit 202 not only performs the process from S105 to S111 for each case in which the CU position is different, but also performs the process from S105 to S111 for the case in which the CU size is different.

First, the ISP pre-analysis unit 202 sets (CU index=0) the CU on which to perform ISP preprocessing (that is, the coding target CU) (step S104). The ISP pre-analysis unit 202 first tests the case where the CU division direction is the vertical direction (Division index=0 (0: vertical, 1: horizontal)) (step S105). For the ISP prediction process, the ISP pre-analysis unit 202 divides the coding target CU set above into a plurality of sub-CUs (SubCU index=0) (step S106). Note that as described above, how many sub-SUs to divide the coding target CU into is determined automatically according to the size of the coding target CU. The ISP pre-analysis unit 202 sets the first sub-CU, and performs the following process.

The ISP pre-analysis unit 202 votes on the edge information calculated in step S103 above for all pixels in the sub-CU set above. With this arrangement, the ISP pre-analysis unit 202 generates a histogram for each edge direction as illustrated in FIG. 5, for example.

Figure 5:
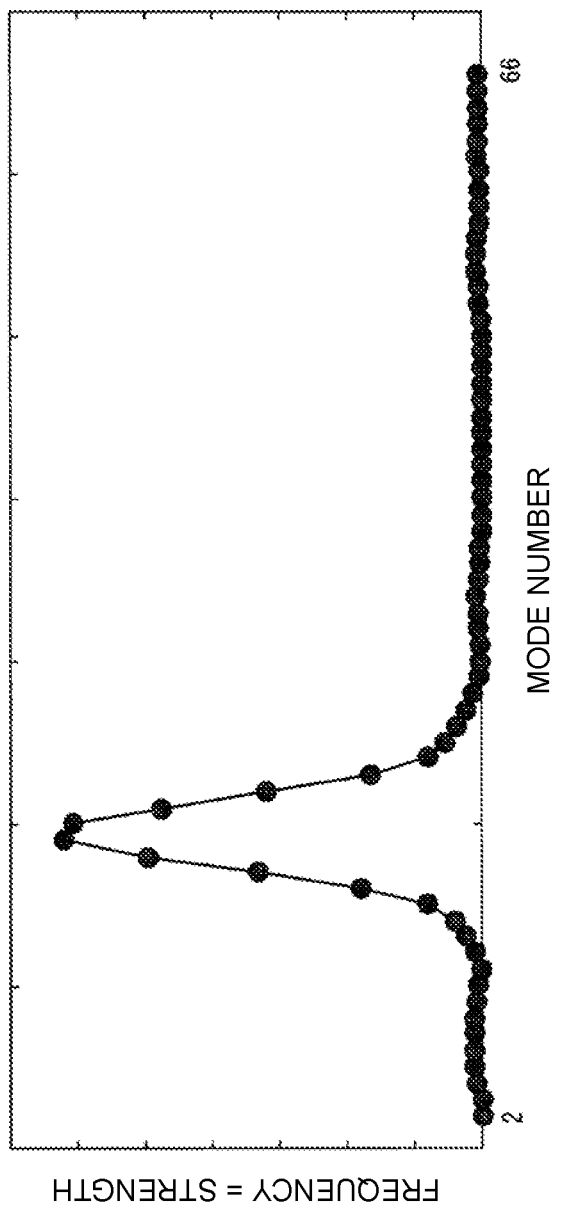
FIG. 5 is a diagram illustrating an example of a histogram generated by the ISP pre-analysis unit 202 according to the first embodiment of the present invention.

FIG. 5 is a diagram illustrating an example of a histogram generated by the ISP pre-analysis unit 202 according to the first embodiment of the present invention. The ISP pre-analysis unit 202 may generate a histogram by successively voting each pixel one at a time for the mode number (the number of the intra prediction mode) corresponding to the edge direction of each pixel, for example. Alternatively, the ISP pre-analysis unit 202 may generate a histogram by successively voting the value of the edge strength for each pixel for the mode number corresponding to the edge direction of each pixel, for example.

Alternatively, the ISP pre-analysis unit 202 may vote for the mode number corresponding to the edge direction of each pixel and several nearby mode numbers, rather than voting for only the mode number corresponding to the edge direction of each pixel, for example. Furthermore, in this case, the ISP pre-analysis unit 202 may vote the largest value for the mode number corresponding to the edge direction of each pixel, and vote smaller values for mode numbers increasingly distant from the mode number corresponding to the edge direction with respect to the nearby mode numbers, for example.

After generating the histogram for the sub-CU set above, the ISP pre-analysis unit 202 sets the mode number of the intra prediction mode having the maximum frequency in the generated histogram as the edge direction of the sub-CU. For example, in the case of the histogram illustrated in FIG. 5, the edge direction of the sub-CU is "9". The ISP pre-analysis unit 202 sets the frequency in the histogram (that is, the strength) for the edge direction of the sub-CU as the edge strength of the sub-CU (step S107).

The ISP pre-analysis unit 202 determines whether or not the sub-CU set above is the last sub-CU in the coding target CU (step S108). In the case of determining that the sub-CU is the last sub-CU (step S108: Yes), the ISP pre-analysis unit 202 proceeds to the process indicated in the following step S109. In the case of determining that the sub-CU is not the last sub-CU (step S108: No), the ISP pre-analysis unit 202 proceeds to the process for the next sub-CU (SubCU index+=1) (step S112), and performs the process from step S107 above on the next sub-CU.

The ISP pre-analysis unit 202 determines whether or not the horizontal division direction of the CU set above is being tested (Division index==1?) (step S109). In the case of determining that the horizontal division direction is being tested (step S109: Yes), the ISP pre-analysis unit 202 proceeds to the process indicated in the following step S110. In the case of determining that the vertical division direction is being tested (step S109: No), the ISP pre-analysis unit 202 next tests the horizontal division direction (Division index+=1) (step S113).

After determining the edge direction and the edge strength of all sub-CUs for the cases of dividing the coding target CU into each division direction (vertical direction and horizontal direction), the ISP pre-analysis unit 202 uses the information about the edge direction and edge strength of the sub-CUs to determine whether or not the ISP prediction process should be executed, the division direction of the candidate CU, and the candidate intra prediction modes (step S110). Note that the method of determining each parameter of the ISP prediction process will be described in detail later.

The ISP pre-analysis unit 202 determines whether or not the CU set above is the last CU in the CTU of the coding target (step S111). In the case of determining that the CU is the last CU (step S111: Yes), the ISP pre-analysis unit 202 ends the ISP pre-analysis process with respect to the CTU of the coding target. In the case of determining that the CU is not the last CU (step S111: No), the ISP pre-analysis unit 202 proceeds to the process for the next CU (CU index+=1) (step S114), and performs the process from step S105 above on the next CU. This concludes the operations by the ISP pre-analysis unit 202 illustrated in the flowchart of FIG. 3.

[Parameter Determination Method]

Hereinafter, a method of determining each parameter of the ISP prediction process performed in step S110 of the flowchart illustrated in FIG. 3 will be described.

The ISP pre-analysis unit 202 executes the ISP prediction process only in the case where at least one group with the same edge direction exists among the (two or four) sub-CUs obtained by dividing the coding target CU. In other words, the ISP pre-analysis unit 202 does not execute the ISP prediction process in the case where no group exists in which the sub-CUs have the same edge direction.

In the case of performing the ISP prediction process, the ISP pre-analysis unit 202 executes the ISP prediction process for only the division direction (vertical direction or horizontal direction) with the greater number of groups in which the sub-CUs have the same edge direction. In the case where the number of groups in which the sub-CUs have the same edge direction is equal in the vertical direction and the horizontal direction, the ISP pre-analysis unit 202 totals the edge strengths of each of the sub-CUs for each of the case of dividing in the vertical direction and the case of dividing in the horizontal direction. Thereafter, the ISP pre-analysis unit 202 may determine the division direction in which to execute the ISP prediction process such that the division direction with the stronger total edge strength is selected.

Alternatively, in the case where at least one group in which the sub-CUs have the same edge direction exists in both the case of division in the vertical direction and the case of division in the horizontal direction, the ISP pre-analysis unit 202 may execute the ISP prediction process for both division directions. Note that the above case where at least one group in which the sub-CUs have the same edge direction exists refers to the case where the same edge direction is outputted from at least two sub-CUs.

In the case of performing the ISP prediction process, the ISP pre-analysis unit 202 treats only the edge direction for which a group in which the sub-CUs have the same edge direction exists as a candidate of intra prediction mode for the ISP prediction process. Note that the ISP pre-analysis unit 202 may treat the three intra prediction modes of the DC mode and the planar mode in addition to the intra prediction mode corresponding to the above edge direction as the candidates of intra prediction mode in the ISP prediction process.

According to the method of determining each parameter of the ISP prediction process as above, by simply performing an equivalence comparison process for each edge direction of the sub-CUs, it is possible to determine whether or not the ISP prediction process should be executed, the division direction of the candidate CU, and the candidate intra prediction modes. This arrangement makes it possible to perform the subsequent narrowing down in the ISP prediction process with a smaller amount of processing.

Second Embodiment

Hereinafter, a second embodiment of the present invention will be described. In the second embodiment, a method like the following which is different from the first embodiment described above is used as the method of determining each parameter of the ISP prediction process performed in step S110 of the flowchart illustrated in FIG. 3.

[Parameter Determination Method]

The ISP pre-analysis unit 202 calculates the maximum value and the minimum value of the mode number of the edge direction for each of (two or four) sub-CUs obtained by dividing the coding target CU. The ISP pre-analysis unit 202 executes the ISP prediction process only in the case where the difference value between the calculated maximum value and minimum value is smaller than a parameter value settable by a user of the encoder. In other words, the ISP pre-analysis unit 202 does not execute the ISP prediction process in the case where the difference value between the calculated maximum value and minimum value is equal to or greater than the parameter value settable by the encoder user for both division directions (both the vertical direction and the horizontal direction) of the coding target CU.

Note that a small difference between the maximum value and the minimum value of the mode number of the edge directions for all sub-CUs means that a sub-CU pointed in a divergent direction does not exist, or in other words, all of the sub-CUs are pointed in the same direction. The above configuration of the ISP pre-analysis unit 202 is intended to cause the ISP prediction process to be performed only in a case like the above.

The ISP pre-analysis unit 202 executes the ISP prediction process for only the division direction (vertical direction or horizontal direction) for which the above difference value is smaller. Alternatively, the ISP pre-analysis unit 202 may execute the ISP prediction process for both division directions in the case where the above difference value is smaller than the parameter value in both division directions (both vertical direction and horizontal direction) of the coding target CU.

In the case of performing the ISP prediction process, the ISP pre-analysis unit 202 generates a histogram of the coding target CU by merging the histograms of all sub-CUs with the same division direction. The ISP pre-analysis unit 202 treats only the mode number with the maximum frequency in the histogram of the coding target CU as the edge direction of the coding target CU and the candidate of the intra prediction mode in the ISP prediction process. Alternatively, the ISP pre-analysis unit 202 may treat the intra prediction modes corresponding to several mode numbers with the highest-ranking frequencies in the histogram of the coding target CU as candidates of the intra prediction mode in the ISP prediction process.

Alternatively, the ISP pre-analysis unit 202 may treat only the intra prediction mode corresponding to the average value of the respective mode numbers for the edge directions of all sub-CUs as the candidate of the intra prediction mode in the ISP prediction process. Alternatively, the ISP pre-analysis unit 202 may treat only the intra prediction modes corresponding to two mode numbers which are the same as the median value or which approximate the median value from among the respective mode numbers for the edge directions of all sub-CUs as the candidate of the intra prediction mode in the ISP prediction process.

Note that the above intra prediction mode corresponding to the average value of the respective mode numbers for the edge directions of all sub-CUs means the intra prediction mode for which the sum of the differences between the respective mode numbers for the edge direction of each sub-CU is minimized.

Note that in all of the intra prediction mode determination methods according to the second embodiment described above, like the first embodiment, the ISP pre-analysis unit 202 may treat the three intra prediction modes of the DC mode and the planar mode in addition to the intra prediction mode corresponding to the above edge direction as the candidates of intra prediction mode in the ISP prediction process.

According to the method of determining each parameter of the ISP prediction process as above, because it is determined whether or not the ISP prediction process should be executed according to the magnitude relationship of values with respect to a parameter value settable by the user of the encoder, it is possible to adjust the usage rate of the ISP prediction process on the encoder side only.

Note that the first embodiment and the second embodiment described above may also be configured such that whether or not the ISP prediction process should be executed, the division direction(s) of the candidate CU, and the candidate intra prediction modes are determined according to respectively different determination methods. For example, a configuration is possible in which whether or not the ISP prediction process should be executed is determined according to whether or not there exists at least one group in which the sub-CUs have the same edge direction, and the intra prediction mode corresponding to the mode number with the maximum frequency in the histogram of the coding target CU is determined as the candidate intra prediction mode.

The video coding device 100 according to each embodiment described above calculates the similarity of the edge information between sub-CUs by utilizing the property whereby the two-dimensional planar directionality and the edge information of each sub-CU in the ISP prediction process is highly correlated with the original intra prediction mode of each sub-CU (the intra prediction mode of the original coding target CU). Additionally, the video coding device 100 uses the calculated similarity to determine whether or not the ISP prediction process should be executed and also each parameter of the ISP prediction process. With this arrangement, the video coding device 100 can reduce the amount of processing for the ISP prediction process in the encoder.

Note that in the embodiments described above, the ISP pre-analysis unit 202 is configured to calculate the edge direction and the edge strength, but may also be configured to calculate the edge direction only. In this case, for example, a configuration that successively votes one fixed value at a time in the histogram rather than a configuration that successively votes the value of the edge strength in the histogram is conceivable. For example, the ISP pre-analysis unit 202 acquires both the X-direction differential strength and the Y-direction differential strength respectively for all pixels existing in the CTU of the coding target. Additionally, the ISP pre-analysis unit 202 may calculate the edge direction at least, and calculate the edge strength depending on the situation.

Note that the video coding device 100 according to each embodiment described above is applicable to a video coding device, a video coding program, and the like in which the available computing power is limited.

All or part of the video coding device 100 according to the embodiments described above may also be achieved by a computer. In this case, a program for realizing the functions may be recorded to a computer-readable recording medium, and the units may be realized by causing a computer system to read and execute the program recorded on the recording medium. Note that the "computer system" referred to herein is assumed to include an OS and hardware such as peripheral devices. In addition, the "computer-readable recording medium" refers to a portable medium such as a flexible disk, a magneto-optical disc, ROM, or a CD-ROM, or a storage device such as a hard disk built into the computer system. Furthermore, the term "computer-readable recording medium" may also encompass media that briefly or dynamically retain the program, such as a communication line in the case of transmitting the program via a network such as the Internet or a communication channel such as a telephone line, as well as media that retain the program for a given period of time, such as volatile memory inside the computer system acting as the server or client in the above case. Moreover, the above program may be a program for achieving a portion of the functions described above, a program with which the functions described above can be achieved in combination with a program already recorded in the computer system, or a program achieved using a programmable logic device such as a field-programmable gate array (FPGA).

REFERENCE SIGNS LIST 100 video coding device
101 intra prediction processing unit
102 inter prediction processing unit
103 predicted image generation unit
104 residual signal generation unit
105 transform/quantization processing unit
106 entropy coding unit
107 inverse quantization/inverse transform processing unit
108 decoded signal generation unit
109 loop filter processing unit
110 reference image data storage unit
201 main intra prediction processing unit
202 ISP pre-analysis unit
203 ISP prediction processing unit

The invention claimed is:

1. A coding method that encodes an image by dividing the image into blocks, comprising:
dividing a coding target image into a plurality of coding unit blocks;
for a given coding unit block in the plurality of coding unit blocks, determining an edge direction and an edge strength of an edge obtained for each pixel in the given coding unit block;
dividing the given coding unit block into a plurality of sub-coding unit blocks;

determining whether or not to perform intra sub-partition prediction on the plurality of sub-coding unit blocks on a basis of an edge direction and an edge strength of an edge obtained for each pixel in the given coding unit block; and encoding a first sub-coding unit block of the plurality of sub-coding unit blocks by referencing a second sub-coding unit block inside the given coding unit block in response to a determination to perform intra sub-partition prediction.

2. The coding method according to claim 1, wherein the encoding step respectively determines the sub-coding unit blocks to which respective pixels in the coding unit block belong on a basis of the edge direction and the edge strength.

3. The coding method according to claim 1,
wherein
in a case where one or more groups exist in which the edge direction of each of the plurality of sub-coding unit blocks obtained by dividing the coding unit block have the same edge direction, the determining step determines to encode by dividing the coding unit block into the plurality of sub-coding unit blocks.

4. The coding method according to claim 3, wherein the encoding step divides the coding unit block into the plurality of sub-coding unit blocks so as to obtain more groups in which the edge direction of each of the plurality of sub-coding unit blocks obtained by dividing the coding unit block have the same edge direction.

5. The coding method according to claim 1,
wherein
in a case where at least one division pattern in which a difference value between a maximum value and a minimum value of a value indicating the edge direction of each of the plurality of sub-coding unit blocks obtained by dividing the coding unit block is less than a predetermined value exists among the division patterns of the coding unit block, the determining step determines to encode by dividing the coding unit block into the plurality of sub-coding unit blocks.

6. The coding method according to claim 5, wherein the encoding step divides the coding unit block into the plurality of sub-coding unit blocks according to the division pattern for which the difference value is less than the predetermined value.

7. The coding method according to claim 1,
wherein
the determining step generates a histogram expressing a distribution of pixels for each number indicating the edge direction of the respective pixels in the sub-coding unit blocks, totals the histograms of each of the plurality of sub-coding unit blocks obtained by dividing the same coding unit block, and treats a maximum frequency of the totaled histogram and the edge direction corresponding to the number with the maximum frequency as the edge strength of the coding unit block and the edge direction of the coding unit block.

8. A coding device that encodes an image by dividing the image into blocks, comprising:
a processor; and
a storage medium having computer program instructions stored thereon,
when executed by the processor, perform to:
for a given coding unit block in the plurality of blocks, determine an edge direction and an edge strength of an edge obtained for each pixel in the given coding unit block;
divide the given coding unit block into a plurality of sub-coding unit blocks;
determine whether or not to perform intra sub-partition prediction on the plurality of sub-coding unit blocks on a basis of an edge direction and an edge strength of an edge obtained for each pixel in the coding unit block; and
encode a first sub-coding unit block of the plurality of sub-coding unit blocks by referencing a second sub-coding unit block inside the given coding unit block in response to a determination to perform intra sub-partition prediction.

9. A non-transitory computer-readable medium having computer-executable instructions that, upon execution of the instructions by a processor of a computer, causing the computer that encodes an image by dividing the image into blocks to execute a process comprising:
for a given coding unit block in the plurality of blocks, determine an edge direction and an edge strength of an edge obtained for each pixel in the given coding unit block;
divide the given coding unit block into a plurality of sub-coding unit blocks;
determine whether or not to perform intra sub-partition prediction on the plurality of sub-coding unit blocks on a basis of an edge direction and an edge strength of an edge obtained for each pixel in the coding unit block; and
encode a first sub-coding unit block of the plurality of sub-coding unit blocks by referencing a second sub-coding unit block inside the given coding unit block in response to a determination to perform intra sub-partition prediction.

* * * * *